United States Patent Office 3,549,662
Patented Dec. 22, 1970

3,549,662
DERIVATIVES OF BAICALEIN
Shunji Imai, Yoshio Kanai, and Hiroshi Otsuka, Suita, Akira Nohara, Toyonaka, and Yasushi Sanno, Ikeda, Japan, assignors to Takeda Chemical Industries, Ltd., Osaka, Japan
No Drawing. Filed Oct. 10, 1968, Ser. No. 766,619
Claims priority, application Japan, Oct. 12, 1967, 42/65,571; Nov. 9, 1967, 42/72,120
Int. Cl. C07d 7/34
U.S. Cl. 260—345.5
15 Claims

ABSTRACT OF THE DISCLOSURE

A water-soluble salt of the partial ester of baicalein with an inorganic polybasic acid. The materials have anti-allergenic properties.

---

This invention relates to new and useful derivatives of baicalein.

Baicalein is a dominant component of *Scutellariae radix*, a crude drug which has for a number of years been used as an antidiarrheal or a sudorific agent, and is a flavone having the following structural formula:

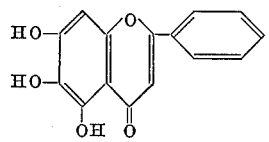

As it is, baicalein is sparingly soluble in water and, therefore, lends itself only poorly to medicinal applications.

The present inventors have found that baicalein can form an ester with phosphoric acid or sulfuric acid and then the baicalein phosphate or sulfate can form salts with, e.g., an alkaline substance without any substantial transformation in the baicalein moiety, and that the ester and the salts are soluble in water.

Moreover, they have found as a surprising fact that the abovementioned esters have remarkable anti-allergenic effects, e.g., anti-inflamatory effect, anti-asthmatic effect, anti dermatosic effect, and they are not accompanied with undesirable side effects.

The principal object of the present invention is therefore to provide such new water-soluble derivatives of baicalein that show remarkable anti-allergenic effects, more particularly, a pharmaceutically acceptable salt of the partial ester of baicalein with an inorganic polybasic acid, the acid being phosphoric acid or sulfuric acid.

Another object of this invention is to provide a method for producing said new and useful derivatives of baicalein.

To realize these objects, baicalein is allowed to react with a phosphorylating agent or sulfating agent, if required, followed by hydrolysis.

The starting material baicalein, as it is employed according to this invention, may be one which has been extracted and isolated from a plant—e.g., *Scutellaria baicalensis* Georg.—or from a crude drug—e.g., *Scutellariae radix*—in the conventional manner, or one which is synthetically available. The starting material, however, need not be a purified preparation.

As the phosphorylating agent, there may be counted such as phosphoric acid, phosphoric acid anhydride, halogenated phosphorus compound (e.g., phosphorus oxychloride, phosphorus oxybromide, tetrachloropyrophosphate, diphenylphosphochloridate, dibenzylphosphochloridate, or phosphorus trichloride), etc.

As the sulfating agent, there may be counted such as chlorosulfonic acid, dioxane compound of sulfuric acid anhydride, tertiary basic compound such as pyridinium sulfatrioxide, triethylammonium sulfatrioxide, etc. Such other compounds as sulfuric acid, sulfuric anhydride, sulfuryl chloride, 1-alkoxyvinyl sulfate, etc., can likewise be employed.

The esterification may be conducted in the absence of a solvent, especially when a halide as mentioned above is used as the esterifying agent, but it may also be carried out in the presence of a solvent, examples of which include tertiary amines such as pyridine, trimethylamine, etc., amides such as dimethylformamide, formamide, etc., aromatic hydrocarbons such as benzene, toluene, etc., and ethers such as diethyl ether, tetrahydrofuran, dioxane, etc., and a mixture thereof. Among those solvents, the tertiary amines or the amides also act as a catalyst or a neutralizing agent for capturing the acid which is produced as the reaction proceeds. It is therefore to be understood that the reaction may be accelerated by allowing such a tertiary amine or amide to exist in the reaction mixture. It is particularly desirable to employ the amides in sulfation.

The reaction temperature is optional within the limits suited for the purpose. Generally speaking, the reaction is conducted at temperatures between about $-10°$ to about $40°$ C.

Thus prepared partial esters of baicalein with phosphoric acid or sulfuric acid are per se easily soluble in water and can be used as medicines. However, due to their dissociable acid groups, they can easily form a variety of still more water-soluble salts with various bases. Therefore, they are recovered as, or converted into, such water-soluble salts thereof which are pharmaceutically acceptable and stable, by subjecting them to neutralization or double-decomposition with a base or a salt, either without prior isolation from the reaction mixture or after isolation by concentration to dryness or by other suitable means. The bases to be employed for the purpose include, among others, alkali hydroxide, e.g., sodium hydroxide, potassium hydroxide, lithium hydroxide, etc., ammonium hydroxide and amines, e.g., monoethanolamine, triethanolamine, alkali carbonate and bicarbonate, e.g., sodium carbonate, sodium bicarbonate, potassium carbonate, etc., and strongly acid cation exchange resins in a salt form of the desired base.

In the method of this invention, the phosphorylation may give one or more of mono-, di- and tri-phosphate of baicalein depending on the conditions. For example, using tetrachloropyrophosphoric acid as the phosphorylating agent, there may be mainly obtained 6-monophosphate, in which the hydroxyl group at position 6 of baicalein is phosphorylated. When phosphorus oxychloride is used as the phosphorylating agent and pyridine as a solvent, there may be mainly obtained 6,7-diphosphate or triphosphate, depending on the reaction conditions such as the amount of the phosphorylating agent employed.

By the sulfation, baicalein-6-monosulfate may be mainly obtained.

It is to be understood however that, in case of baicalein-6-monophosphate, there may occur rearrangement of the phosphono group from the position 6 to the position 7 to form 7-phosphate or 6,7-cyclic monophosphate during its purification, recrystallization or other procedures.

Among the object compounds of this invention, the salts of baicalein monophosphate and of baicalein monosulfate are most desirable in view of the ease of their production and their properties suitable for medicinal preparations.

The physiological properties of the compounds of this invention are demonstrated in the following tests.

TEST 1.—ACUTE TOXICITY

Test animal: mice (ICR–JCL strain, 4 weeks old).
Test period: 7 days.

TABLE 1.—VALUE OF $LD_{50}$ (mg./kg.)

| | Compound | | | |
|---|---|---|---|---|
| | Disodium salt of baicalein-6-mono phosphate | | Sodium salt of baicalein-6-mono sulfate | |
| | Sex | | | |
| Route of administration | Male | Female | Male | Female |
| Intravenous injection | 550 | 530 | 350 | 360 |
| Intraperitoneal injection | 810 | 760 | 660 | 680 |
| Intradermal injection | 910 | 870 | 760 | 750 |
| Per os | 2,850 | 2,750 | >5,000 | >5,000 |

TEST 2.—ANTI-INFLAMMATORY ACTIVITY

The anti-inflammatory activity of the compounds was examined by the method described in Archives Internationals de pharmacodynamie et de Therapie 123, 71 (1959), using as anti-rat serum of rabbit origin as the phlogogenic agent and male rats (Wister strain) weighing about 150 g. as test animals. The test compounds were administered to the mice intravenously 10 minutes before the intradermal injection of the phlogogenic agent.

The results are shown in Table 2.

TABLE 2

| Test compounds | Dose mg./kg. | Number of experiments | Intensity of inflammation | Inhibition of inflammation, percent |
|---|---|---|---|---|
| Control | 0 | 12 | 70.3±1.33 | |
| Disodium baicalein-6-monophosphate | 5.0 | 12 | 49.1±2.36 | 29.3±2.37 |
| Sodium baicalein-6-monosulfate | 5.0 | 12 | 54.7±2.38 | 22.2±2.61 |

It is further to be noted that the novel salts of the present invention do not show any substantial side effects in the host when administered whether orally or parenterally. This renders the novel salts advantageous as antiallergenic agents over hitherto known medicines such as isoproterenol, ephedrine (both of which often cause damage to heart), prednisolones (which often cause hormonic imbalance) and so on. The fact of no such undesirable side effects in the case of the novel salts of this invention also suggests that they have a characteristic mode of action which is quite different from that of the hitherto-known anti-allergenic agents.

Pharmaceutical compositions containing the compound of the present invention can be prepared according to any per se conventional method for the preparation of tablets, capsules, suppositories, syrups or injections.

A typical effective daily dose for the treatment of inflammation in human adult is, when administered per os, about 50 to 200 mg., but usually about 50 to 100 mg. in terms of the free partial ester of baicalein; while it is about 20 to 200 mg., usually about 30 to 50 mg. in case of injection.

For the purpose of a better understanding of this invention, the following examples are given. However, the examples are not to be construed as limitations of this invention.

In these examples, parts by weight bear the same relation to parts by volume as do grams to milliliters.

Example 1

To 600 parts by volume of tetrachloropyrophosphate is gradually added 100 parts by weight of baicalein under ice-cooling and stirring, over a period of about 1 hour. After an additional stirring for 1 hour, the reaction mixture is poured into ice-water, while keeping the temperature below 30° C. The aqueous mixture is centrifuged to collect precipitates, which are then washed with water and dried. The resulting solid is dissolved in 1500 parts by volume of tetrahydrofuran under stirring and concentrated in vacuo. To the concentrate is added 100 parts by volume of water, and then the remaining tetrahydrofuran is completely distilled out to leave a syrup. Water is added to the syrup and then the syrup is triturated to cause precipitation in the water. The precipitates are centrifugally collected, washed twice with water, and again suspended in 3000 parts by volume of water under stirring. The suspension is adjusted to pH 6.0 with a concentrated aqueous sodium hydroxide solution and is subjected to centrifugation to obtain a supernatant solution. The precipitates are washed twice with water. The washings are combined with the supernatant solution. The solution is concentrated under reduced pressure at a temperature not higher than 50° C. to leave a syrup-like substance, while gel-like substance, if produced, is filtered out. The concentrate is vigorously stirred in ethanol. The resulting solids are collected by centrifugation, washed once with ethanol and then twice with ethyl ether, and dried over NaOH grains to obtain 100 parts by weight of crude disodium baicalein-6-monophosphate.

The crude baicalein salt is dissolved in 300 parts by volume of water and boiled under stirring for 10 minutes. After cooling, 200 parts by volume of ethanol is added to the mixture and precipitates are collected by centrifugation. The precipitates are washed first with 50% aqueous ethanol, second with ethanol, and finally twice with ethyl ether to obtain 320 parts by weight of purified disodium baicalein-6-monophosphate.

*Elementary analysis.*—Calculated for $$C_{15}H_9O_8PNa_2 \cdot 2H_2O$$

(percent): C, 41.88; H, 3.05; P, 7.20. Found (percent): C, 41.46; H, 2.73; P, 7.42.

Ultraviolet absorptions:

$$\lambda_{max.}^{H_2O}\ 273\ m\mu,\ 327\ m\mu$$

$$\lambda_{mxx.}^{0.1N-NaOH}\ 269\ m\mu,\ 361\ m\mu$$

This compound is converted into its monoethanolamine salt according to the following process.

1 part by weight of disodium baicalein-6-monophosphate is suspended in 5 parts by volume of water, and thereto is added monoethanolamine type of strongly acid cation exchange resins in bead form (commercially available as Amberlite IR–120). The resin is filtered out and the filtrate is concentrated, followed by recrystallization from ethanol, whereupon 0.53 part by weight of monoethanolamine salt of baicalein-6-monophosphate is obtained in needle-like crystal. M.P. 159°–162° C. (decomp.).

*Elementary analysis.*—Calculated for $C_{19}H_{25}O_{10}N_2P$ (percent): C, 48.31; H, 5.34; N, 5.95; P, 6.56. Found (percent): C, 48.37; H, 5.71; N, 6.13; P, 6.68.

Example 2

To a solution of 4.3 parts by weight of baicalein in 20 parts by volume of pyradine, there is added dropwise 2.92 parts by volume of phosphorus oxychloride, while cooling with ice-water and constantly stirring over 20 minutes. The stirring is further continued for 2 hours to allow the reaction to proceed. 20 parts by volume of water is added to the reaction mixture to decompose the excess phosphorus oxychloride. Then, the pyridine and the water are distilled out under reduced pressure to leave a residue, and 400 parts by volume of N-hydrochloric acid is added to the residue. The precipitates are collected centrifugally and washed twice with water. The resulting solid is suspended in a small amount of water, and N-aqueous potassium hydroxide solution is thereto added to adjust the suspension to pH 7.

The insolubles are filtered off and extracted with water. The extract is combined with the filtrate. The combined solution is then concentrated to about 15 parts by volume, to which is added 300 parts by volume of ethanol, whereupon yellow fine particles separate out. The particles are separated centrifugally and dried to yield about 2 parts by weight of potassium salt of baicalein-6,7-diphosphate.

*Elementary analysis.*—Calculated for $C_{15}H_8O_{11}P_2K_4$ (percent): P, 10.15. Found (percent): P, 10.61.

Ultraviolet absorptions:

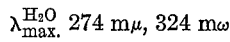

$\lambda_{max}^{H_2O}$ 274 m$\mu$, 324 m$\omega$

Example 3

To a solution of 40 parts by weight of baicalein in 500 parts by volume of pyridine, there is added dropwise 40 parts by volume of phosphorus oxychloride, while cooling with ice-water and constantly stirring over 30 minutes. The reaction is further allowed to proceed for 3 hours. 250 parts by volume of water is added to the reaction mixture to decompose the excess phosphorus oxychloride. The solvent is distilled out under reduced pressure and 1000 parts by volume of N-hydrochloric acid is added to the residue. The resulting precipitates are collected centrifugally, washed three times with water, and again suspended in 500 parts by volume of water. N-sodium hydroxide is gradually added to adjust the suspension to pH 7. The insolubles are filtered and extracted with 500 ml. of water. The resulting extract is combined with the filtrate. The combined solution is concentrated to about 40 parts by volume, and 1000 parts by volume of ethanol is added to the concentrate, whereupon yellow fine particles separate out. The particles are separated centrifugally and dried to yield about 18.3 parts by weight of sodium salt of baicalein - 6,7 - diphosphate.

*Elementary analysis.*—Calculated for $$C_{15}H_8O_{11}P_2Na_4 \cdot 3H_2O$$

(percent): C, 31.18; H, 2.16; P, 11.59. Found (percent): C, 31.49; H, 2.46; P, 10.83.

Ultraviolet absorptions:

$\lambda_{max}^{H_2O}$ 274 m$\mu$, 324 m$\mu$

Infrared absorptions: 3450, 2950, 2650(broad), 1663, 1624, 1590, 1450, 1380, 1165, 1110, 992, 931, 765, 681 (cm.$^{-1}$).

Example 4

To a solution of 1 part by weight of baicalein in 5 parts by volume of pyridine, there is added 1.4 part by volume of phosphorus oxychloride. The reaction is allowed to continue at room temperature for 4 hours. The reaction mixture is treated in the same manner as in Example 1. The insolubles collected from the reaction mixture under acidic conditions are suspended in water, and the suspension is adjusted to pH 7 with sodium hydroxide. The water-soluble fraction is concentrated, and ethanol is added to the concentrate to yield 0.35 part by weight of sodium salt of baicalein-5,6,7-triphosphate.

*Elementary analysis.*—Calculated for $$C_{15}H_7O_{14}P_3Na_6 \cdot 2\tfrac{1}{2}H_2O$$

(percent): C, 26.22; H, 1.76; P, 13.53. Found (percent): C, 25.78; H, 1.90; P, 14.40.

Ultraviolet absorptions:

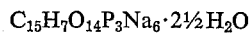

$\lambda_{max}^{H_2O}$ 274 m$\mu$, 324 m$\mu$

Example 5

To a solution of 100 parts by weight of baicalein, in a mixture of 714.3 parts by volume of tetrahydrofuran and 178.5 parts by volume of dimethylformamide, there is added 107.2 parts by weight of trimethylammonium sulfatrioxide and after 3 hours, further 10 parts by weight of the same. The reaction is allowed to proceed at room temperature for about 5 hours. Then 357.2 parts by volume of water is added to the reaction mixture and the whole mixture is adjusted to pH 6.5 with conc. aqueous ammonia. The solvent is then evaporated under reduced pressure. To the residue is added 200 parts by volume of water, and the mixture is stirred and then kept in an ice-room overnight. The resulting precipitates are collected by filtration and washed with a small amount of water for four times. So-treated precipitates are suspended into 2600 parts by volume of water, followed by the addition of 1000 parts by volume of Na-type of strongly acid cation exchange resins in bead form (commercially available as Amberlite IR–120). After stirring for 40 minutes, the mixture is heated at 50° C. in waterbath to dissolve the precipitates. The resins are filtered out and the filtrate is concentrated to dryness below 40° C. The residue is solidified in 700 parts by volume of ethanol and filtered.

By washing with ethanol and ethyl ether, 120 parts by weight of sodium baicalein-6-monosulfate is obtained. By further washing with water and ethanol 90 parts by weight of purified sodium baicalein-6-monosulfate is obtained.

*Elementary analysis.*—Calculated for $$C_{15}H_9O_8SNa \cdot 2.4H_2O$$

(percent): C, 43.35; H, 3.32; S, 7.71. Found (percent): C, 43.17; H, 2.96; S, 8.25.

Ultraviolet absorptions:

$\lambda_{max}^{H_2O}$ 270 m$\mu$, 316 m$\mu$

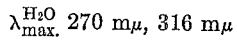

$\lambda_{max}^{0.1N-NaOH}$ 267.5 m$\mu$, 363 m$\mu$

This compound is converted into its monoethanolamine salt or triethanolamine salt according to the following process.

To a solution of 2 parts by weight of sodium baicalein-6-monosulfate in 50 parts by volume of water, there is added monoethanolamine type of Amberlite IR–120 under stirring. The resins are filtered out, and the filtrate is concentrated, followed by recrystallization from ethanol to obtain 1.35 part by weight of monoethanolamine salt of baicalein-6-monosulfate in needle-like yellow crystals. M.P. higher than 240° C.

*Elementary analysis.*—Calculated for $$C_{17}H_{17}O_9NS \cdot 1/2H_2O$$

(percent): C, 48.57; H, 4.32; N, 3.33; S, 7.63. Found (percent): C, 48.72; H, 4.00; N, 3.33; S, 7.93.

The same procedure as above is carried out using triethanolamine type of Amberlite IR–120 in place of monoethanolamine type of Amberlite IR–120 to obtain triethanolamine salt of baicalein-6-monosulfate. M.P. higher than 240° C.

*Elementary analysis.*—Calculated for $$C_{21}H_{25}O_{11}NS \cdot 1/2H_2O$$

(percent): C, 49.60; H, 5.15; N, 2.75; S, 6.31. Found (percent): C, 49.42; H, 4.97; N, 2.72; S, 6.79.

Example 6

To a solution of 1.12 part by weight of baicalein in a mixture of 8 parts by volume of dimethylformamide, there is added 1.08 part by weight of triethylammonium sulfatrioxide. The reaction is conducted at room temperature for about 5 hours. The reaction mixture is adjusted to pH 5 with dilute aqueous ammonia. On addition of 1.53 part by weight of barium acetate, precipitates of barium baicalein monosulfate are obtained. The precipitates are collected centrifugally and washed with water. The product is then shaken with Na-type of Amberlite IR–120 in 100 parts by volume of water to convert the former to a water-soluble sodium salt. The resin is removed and the resulting aqueous solution is concentrated, whereupon crude sodium baicalein monosulfate (containing sodium sulfate as inorganic impurity) is obtained. This crude product is allowed to recrystallize twice from water to yield 0.75 part by weight of purified sodium baicalein-6-monosulfate.

*Elementary analysis.*—Calculated for $$C_{15}H_9O_8SNa \cdot 3H_2O$$

(percent): C, 42.56; H, 3.54; S, 7.52. Found (percent): C, 42.22; H, 3.19; S, 7.43.

Example 7

To a solution of 0.28 part by weight of baicalein in a mixture of 4 parts by volume of tetrahydrofuran and 2 parts by volume of dimethylformamide, there is added 0.72 part by weight of triethylammonium sulfatrioxide. The reaction is allowed to proceed at room temperature for about 3 hours. The reaction mixture is treated in the same manner as in Example 5, and the resulting potassium salt is recrystallized from water to yield 0.202 part by weight of potassium baicalein-6-monosulfate.

Example 8

To a solution of 0.56 part by weight of baicalein in 6 parts by volume of dimethylformamide, there is added 0.64 part by weight of pyridinium sulfatrioxide. Under stirring, the reaction is allowed to proceed at room temperature. When the reaction is complete, pH of the reaction mixture is adjusted with aqueous ammonia and treated in the same manner as an Example 6.

Finally, on recrystallization from water, 0.41 part by weight of ammonium baicalein-6-monosulfate is obtained.

Typical compositions comprising a compound of this invention are shown by way of examples as follows:

COMPOSITION 1

| | Mg. |
|---|---|
| (1) Disodium salt of baicalein monophosphate | 50 |
| (2) Inositol | 100 |
| (3) Benzyl alcohol | 20 |

All ingredients are dissolved in water to make the total volume 2.0 ml., the resultant admixture being pH 7.5 and serving as injection.

COMPOSITION 2

| | Mg. per tablet |
|---|---|
| (1) Disodium salt of baicalein monophosphate | 50 |
| (2) Lactose | 35 |
| (3) Cornstarch | 120 |
| (4) Microcrystalline cellulose | 30 |
| (5) Magnesium stearate | 5 |
| | 240 |

(1), (2), (3), ⅔ quantity of (4) and half quantity of (5) are thoroughly mixed, and then the mixture is granulated. Remaining ⅓ quantity of (4) and half of (5) are added to the granules and compressed into tablets. Thus prepared tablets can further be coated with, e.g., sugar.

COMPOSITION 3

| | Mg. per capsule |
|---|---|
| (1) Disodium salt of baicalein monophosphate | 50 |
| (2) Lactose | 72 |
| (3) Microcrystalline cellulose | 70 |
| (4) Magnesium stearate | 8 |
| | 200 |

(1), (2), (3) and half quantity of (4) are thoroughly mixed, and then the mixture is granulated. Remaining half of (4) is added to the granules and the whole is filled into a gelatin capsule.

What is claimed is:

1. A pharmaceutically acceptable water-soluble salt of the partial ester of baicalein with an inorganic polybasic acid, the acid being selected from the group consisting of phosphoric acid and sulfuric acid.
2. The compound according to claim 1, wherein the salt is one selected from the group consisting of sodium, potassium, ammonium, monoethanolamine and triethanolamine salts.
3. The salt according to claim 1, wherein the partial ester of baicalein is baicalein monophosphate.
4. The salt according to claim 1, wherein the partial ester of baicalein is baicalein diphosphate.
5. The salt according to claim 1, wherein the partial ester of baicalein is baicalein triphosphate.
6. The salt according to claim 1, wherein the partial ester of baicalein is baicalein monosulfate.
7. Disodium baicalein-6-monophosphate.
8. Monoethanolamine salt of baicalein-6-monophosphate.
9. Potassium salt of baicalein-6,7-diphosphate.
10. Sodium salt of baicalein-6,7-diphosphate.
11. Sodium salt of baicalein-5,6,7-triphosphate.
12. Sodium baicalein-6-monosulfate.
13. Monoethanolamine salt of baicalein-6-monosulfate.
14. Potassium baicalein-6-monosulfate.
15. Ammonium baicalein-6-monosulfate.

References Cited

UNITED STATES PATENTS 2,457,932   1/1949   Solmssen et al.   260—345.5
3,429,896   2/1969   Bossert et al.   260—345.5X JOHN M. FORD, Primary Examiner U.S. Cl. X.R.

424—283